United States Patent [19]
Wagner

[11] 3,999,621
[45] Dec. 28, 1976

[54] LOW PROFILE PLATFORM WEIGHING SCALE

[75] Inventor: Herbert A. Wagner, Corona Del Mar, Calif.

[73] Assignee: Howe Richardson Scale Company, Clifton, N.J.

[22] Filed: Dec. 18, 1974

[21] Appl. No.: 534,087

[52] U.S. Cl. .................................. 177/1; 177/133; 177/255
[51] Int. Cl.$^2$ ...................................... G01G 21/00
[58] Field of Search .......................... 177/132–135, 177/255, 253, 211

[56] References Cited
UNITED STATES PATENTS

| | | | |
|---|---|---|---|
| 2,835,484 | 5/1958 | Bradley | 177/255 X |
| 3,123,166 | 3/1964 | Schellentrager | 177/132 X |
| 3,679,011 | 7/1972 | Hawver | 177/134 |

OTHER PUBLICATIONS

Shames, I.H.; Engineering Mechanics–Statics & Dynamics; Second Edition, Prentice–Hall Inc., 1967, pp. 107–112.

*Primary Examiner*—Joseph W. Hartary
*Attorney, Agent, or Firm*—Norris & Bateman

[57] ABSTRACT

A weighing scale in which a plurality of load cells support a load-receiving structure and in which a statically determinate restraint system is employed to restrain horizontal movement of the assembly of the load cells and the load-receiving structure.

23 Claims, 11 Drawing Figures

LOW PROFILE PLATFORM WEIGHING SCALE

FIELD OF INVENTION

This invention relates to weighing apparatus and is especially concerned with platform weighing scales.

BACKGROUND

Low profile platform scales for weighing relatively heavy loads are characterized by having a relatively small overall height as measured from the floor or other scale-support surface to the top of the load-receiving platform or deck. Scales of this type are especially suitable for weighing loads which are carted by such vehicles as tote bins, push carts, dollies, fork lift trucks and other usually relatively small motor vehicles.

Low profile type platform scales normally do not require installation in a pit to accommodate load-carrying vehicles and roll-on loads in general because the platform is relatively close to the floor surface and can easily be accessed by relatively short, gently sloped ramps. Thus, low profile type platform scales offer the significant advantage of pitless installation. On the other hand, in installations where it is desired to locate the platform flush with the floor surface, only a shallow pit is needed.

Various structural features contribute to the relatively high heights of the platform in prior non-low profile type vehicle platform scales to make them unsuitable for handling roll-on or wheel-on loads without installing the scale in a relatively deep pit.

In earlier versions of vehicle platform scales, platform-supporting lever systems contribute greatly to the overall height of the scale. In later versions which employ load cells directly support the load-receiving platform, the overall scale height may be reduced somewhat, but the need arises for horizontal restraint systems and particularly for systems for minimizing side loading of the platform-supporting load cells. These systems, as heretofore constructed, are generally relatively high and would contribute significantly to the overall ground-to-platform height in a low profile type platform scale.

Load cell side loading impairs the accuracy of weight measurements and is the result of applying horizontal force components to the load cell. Factors contributing to load cell side loading mainly are temperature-induced expansion and contraction of the platform and horizontal shock loads which result from the application of rolling loads to the platform.

One example of a vehicle platform scale in which the platform is typically supported by load cells at the corners of the platform is described in U.S. Pat. No. 3,587,761 which issued on June 28, 1971 to L.C. Merriam et al. In this patent the structure for effectively preventing side loading of the load cells is vertically interposed between each load cell and the platform to significantly increase the overall ground-to-platform height of the scale.

Various proposals have been made in the past to reduce the ground-to-platform height to a low profile stature. One prior arrangement, which is frequently used, mounts the load cells outboard of the load-receiving platform in side curb housings. These side curb housings are significantly higher than level of the platform itself and customarily extend the full length of the platform on opposite sides thereof.

Such side curb housings are objectionable because they constitute obstructions which block access to the platform except from opposite ends of the scale. In comparison with the inboard arrangement where the load cells are under and directly support the platform, the outboard arrangement of the load cells additionally requires a special lever or flexure system extending between the platform and the floor to transfer the load-induced forces from the platform to the load cells. Such lever and flexure systems govern the ground-to-platform height of the scale and add significantly to the manufacturing cost thereof.

Apart from low profile considerations, known prior horizontal restraint systems in platform type scales, which are suitable for accommodating roll-on loads, are typically of the redundant or over-restraining type. A redundant and hence statically indeterminate restraint system is, in general, one which develops more than the minimum required number of reactive components to counteract all externally applied forces exerted on a free body to keep the free body stable or in equilibrium.

In platform scales, a redundant restraint system creates a problem in that strains developing from thermal expansion of the platform and other factors cause objectionable side loading of the platform-supporting load cells, and load cell side loading, as previously mentioned, induces errors in the weight measurements.

Examples of prior platform and other vehicle scales are described in U.S. Pat. No. 3,587,761 issued on June 28, 1971 to L. C. Merriam et al., U.S. Pat. No. 3,103,984 issued on Sept. 17, 1963 to C. L. Ellis et al., U.S. Pat. No. 3,266,585 issued on Aug. 16, 1966 to C. D. Boadle, U.S. Pat. No. 3,082,834 issued on Mar. 26, 1963 to C. L. Ellis, U.S. Pat. 2,793,851 issued on May 28, 1957 to A. C. Ruge, U.S. Pat. No. 2,962,276 issued on Nov. 29, 1960 to A. L. Thurston, U.S. Pat. No. 3,299,976 issued on Jan. 24, 1967 to C. D. Boadle et al., U.S. Pat. No. 3,565,196 issued on Feb. 23, 1971 to E. Laimins et al., U.S. Pat. No. 3,679,011 issued on July 25, 1972 to I. M. Hawver, U.S. Pat. No. 3,526,287 issued on Sept. 1, 1970 to R. Flinth, and German Pat. No. 673,395 (Ausgegeben Mar. 21, 1939).

SUMMARY & OBJECTS OF INVENTION

One of the major objects of this invention resides in the provision of a novel low profile type platform weighing scale which is especially suitable for weighing roll-on loads without requiring installation in a pit and which has an extremely low floor-to-platform height.

Another major object of this invention is to provide a novel load cell weighing scale in which the assembly of the platform or other load-receiving structure and the platform-supporting load cells is restrained against horizontal movement by being secured to a scale support floor or ground through a restraint system which, unlike prior restraint systems, is statically determinate. Additionally, the statically determinate restraint system of this invention is so constructed and arranged that it does not contribute significantly to the floor-to-platform height of a low profile type platform scale.

As applied to a load cell platform scale, horizontally directed external forces tending to horizontally move the load cell and platform assembly are transferred through a preselected number of the platform-supporting load cells to the restraint system of this invention, and the reactions to these external forces are developed at one or more restraint points of the restraint system.

In the preferred embodiment of this invention, the load cells are each seated on an anti-friction support surface. In this manner, no reactions of any consequence are developed at the interface between each load cell and its support to render the horizontal restraint statically indeterminate. In this invention, substantially all of the horizontally directed external forces are transferred through the statically determinate restraint system for reaction at one or more restraint points in the system.

By virtue of being statically determinate, the novel restraint system of this invention prevents any significant side loading of the load cells due to thermal expansion of the platform, strains along a horizontal plane in the platform, and horizontal movement of the restraint points of the restraint system. Additionally, the horizontal restraint system of this invention is constructed to prevent excessive load cells side loading due to horizontal shock as occasioned by the application of rolling loads on the platform.

Furthermore, the assembly of the restraint system together with the anti-friction load cell support is so constructed that it lies almost entirely between the top and bottom faces of the load cells so as to contribute only negligibly to the ground-to-platform height of the scale. The ground-to-platform height of the low profile scale of this invention is therefore substantially a function of only the height of the platform-supporting load cells and the thickness or height of the platform above the plane which contains the top faces or upper ends of the load cells.

Additionally, the overall height of the novel horizontal restraint system which lies above a plane containing the bottom faces of the load cells is so small that it does not exceed the exceptionally low height of such low profile load cells as pancake type cells. Thus, pancake type load cells may effectively be employed in the scale of this invention to minimize the ground-to-platform height because this height will be governed primarily by the load cell height and the height of the platform above the load cells, and not by the restraint system itself.

The load cells in the scale of this invention are arranged inboard of the platform (i.e., vertically beneath the platform) and directly support the platform, preferably at the corners thereof. Therefore, no lever and/or flexure systems are required as in the case of the previously described prior low profile platform scales which employ an outboard arrangement of the load cells.

Additionally, the horizontal restraint system of this invention has a high degree of rigidity under vertical loads, is simple and rugged in construction, is inexpensive to manufacture and is easy to install.

In view of the foregoing advantages, it will be appreciated that the novel restraint system of this invention is applicable for various different type of load cells scales which is subject to thermal expansion and/or horizontal shock.

With the foregoing in mind, a more specific object of this invention is to provide a load cell platform scale with a novel horizontal restraint system which renders the platform-supporting load cells substantially insensitive to thermal expansion of the platform and to horizontal movement of restraint points of the system.

Still another object of this invention is to provide a load cell platform scale with a novel horizontal restraint system which, in addition to being statically determinate, has a high degree of rigidity under vertical loads and is of rugged, simplified construction.

Still another important object of this invention is to provide a low profile type platform scale with a novel horizontal restraint system which lies substantially entirely between the top and bottom faces of preferably low profile platform-supporting load cells so as not to contribute significantly to the ground-to-platform height of the scale.

Further objects of this invention will appear as the description proceeds in connection with the appended claims and below-described drawings.

DETAILED DESCRIPTION

Figure 1:
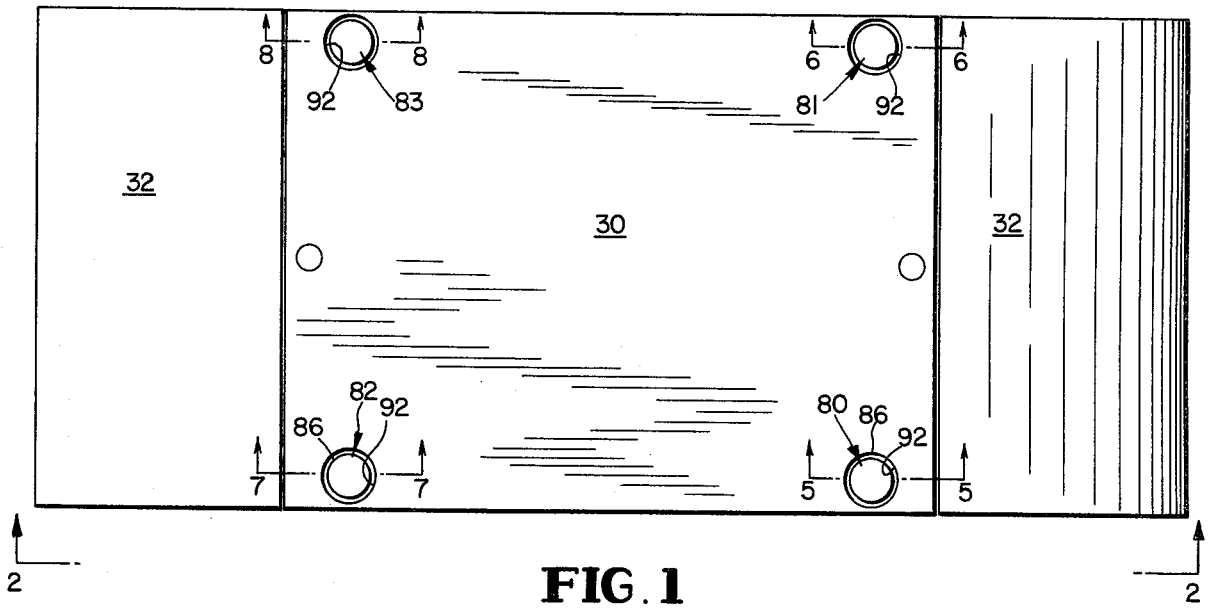
FIG. 1 is a plan view of a low profile type platform scale which incorporates the principles of this invention.
Figure 2:
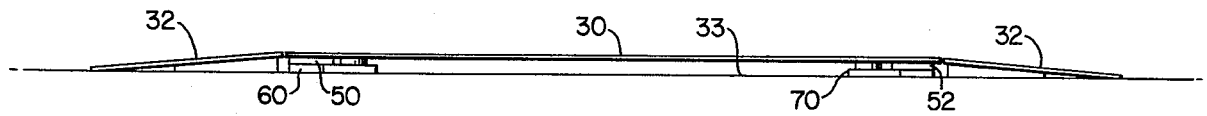
FIG. 2 is a side elevation of the scale and ramp assembly shown in FIG. 1 as seen from lines 2—2 on FIG. 1.

Referring to drawings and particularly to FIGS. 1–4, the low profile platform weighing scale incorporating the principles of this invention comprises a platform or deck structure 20, platform-supporting load cells 22, 23, 24 and 25, and the statically determinate horizontal restraint system which is indicated at 28. Restraint system 28 is effective to restrain horizontal bodial motion of the load cell and platform assembly which consists of load cells 22–25 and platform structure 20.

In the illustrated embodiment structure 20 comprises a rectangular load-receiving platform or deck 30 which is formed by a suitable structural plate and which is directly supported at each corner by one of the load cells 22–25. For the pitless installation shown in FIG. 1 and 2 a ramp structure 32 provides access to platform 30. Although a rectangular platform is shown in the illustrated embodiment, it will be appreciated that the various features of this invention may be employed with different platform configurations if desired.

Assembly 20 rests upon load cells 22–25 which are inboard of and hence vertically beneath platform 30. Each load cell 22–25 is restrained against horizontal movement relative to platform 30 and is mounted for sliding movement relative to the scale support surface which is indicated at 33 in FIG. 2. Load cells 22–25 may be of any suitable type and preferably have a small overall height to minimize the floor-to-platform height of the scale. In this embodiment, load cells 22–25 are advantageously of the conventional pancake compression type which is responsive to an applied load to produce a d. c. signal voltage whose magnitude is a function of the weight of the load. The overall height of such pancake type load cells generally ranges from about 1 inch to about 1 ⅜ inches. Other types of load cells or transducers, such as hydraulic load cells, may be utilized if they have a sufficiently low profile. Pancake type load cells are particularly advantageous because they are structurally very stiff in both horizontal and vertical directions. Referring to FIG. 3–8, and anti-friction seat 34 (see FIGS. 5–8) is provided for each load cell. Load cells 22–25, instead of being fixed to the floor or other scale support surface, are supported on seats 34 for relatively friction-free sliding movement. The purpose of seats 34 is to substantially eliminate the development of friction-produced reactions at the interface between each load cell and its support surface. So far as the invention claimed herein is concerned, seats 34 may be of any suitable construction.

In the illustrated embodiments each seat 34 advantageously comprises a thin, fixed pad 40 and an anti-friction member which may be in the form of a thin flat-sided anti-friction washer 42. Pad 40 is suitably secured to the scale support floor and has a smooth, flat anti-friction upper surface 44 on which washer 42 is slidably seated. Washer 42, if used, is fixed (as be cementing) to or otherwise retained against the flat underside of the load cell housing which is indicated at 46.

Pad 40 is advantageously formed from a suitable stainless steel plate, and surface 44 may be highly polished so that the assembly of washer 42 and the load cell is smoothly slidable on pad 40 with minimum friction. With this construction, a low friction sliding interface is established between washer 42 and pad 40. Washer 42 may be eliminated if friction is kept to a minimum.

Other friction seating arrangements may be utilized to establish the sliding interface between each load cell and the scale support floor or other surface.

Figure 3:
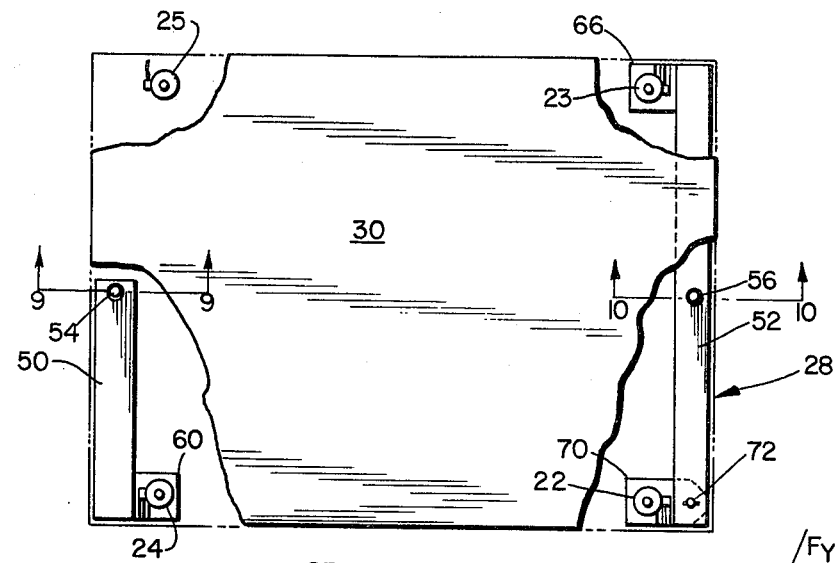
FIG. 3 is a plan view of the low profile platform scale shown in FIG. 1, but with the platform partially broken away to show details of the load cell arrangement and the horizontal restraint system of this invention.
Figure 4:
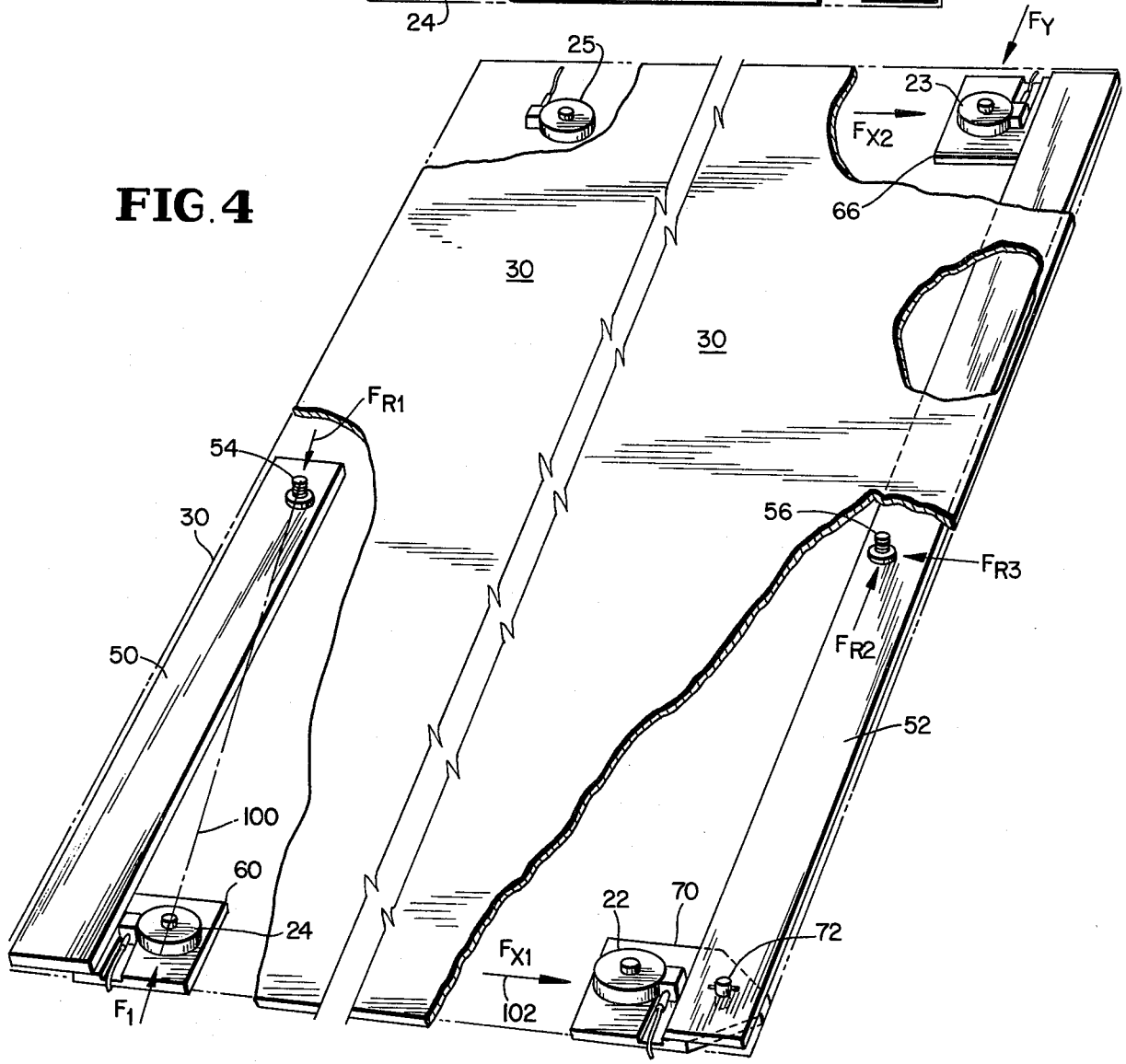
FIG. 4 is a perspective view of the scale structure shown in FIG. 3.
Figure 5:
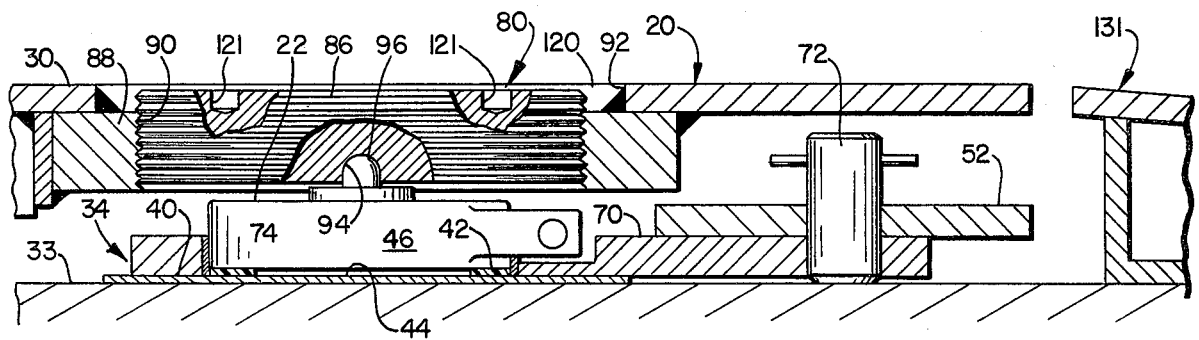
FIG. 5 is a section taken substantially along line 5—5 of FIG. 1.
Figure 9:
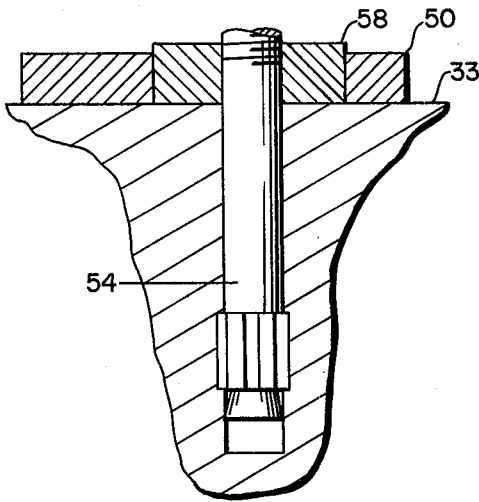
FIG. 9 is a section taken substantially along line 9—9 of FIG. 3.
Figure 10:
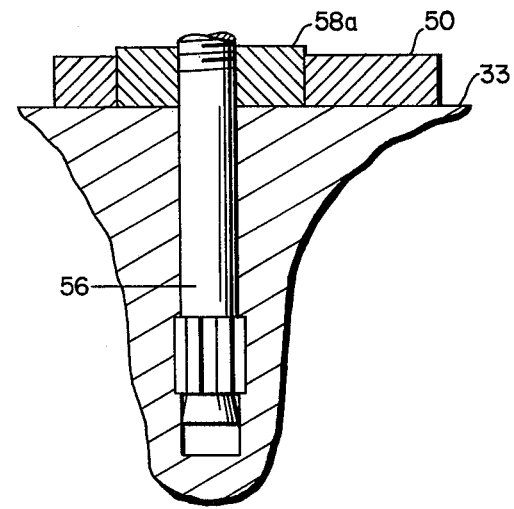
FIG. 10 is a section taken substantially along line 10—10 of FIG. 3.

As shown in FIGS. 3 and 4, restraint system 28, comprises a pair of horizontally extending force transfer restraint bars or structural members 50 and 52 and a pair of suitable restraint members such as anchor bolts 54 and 56. Anchor bolts 54 and 56 are fixed in the scale support floor at opposite ends of platform 30 as shown in FIGS. 9 and 10. The axes of bolts 54 and 56 are parallel and are substantially normal to the horizontal scale support surface 33. Restraint bars 50 and 52 lie adjacent to the opposite facing edges of platform 30 and are pivotally mounted on anchor bolts 54 and 56 respectively.

To enable restraint bar 50 to freely pivot about the axis of anchor bolt 54, a bushing 58 (see FIG. 9) of suitable material is coaxially received with a loose fit in an aperture which is formed through restraint bar 50 near one end thereof. Anchor bolt 54 coaxially extends with a tight fit through bushing 58. A similar bushing 58a (FIG. 10), which coaxially receives anchor bolt 56 and which is coaxially positioned with a loose fit in an aperture through restraint bar 52, provides for the smooth pivotal displacement of restraint bar 52 about the axis of anchor bolt 56.

Thus, while restraint bars 50 and 52 are freely pivotable about the axes of their respective anchor bolts they are confined against displacement in a direction extending perpendicularly of the anchor bolt axes.

Figure 7:
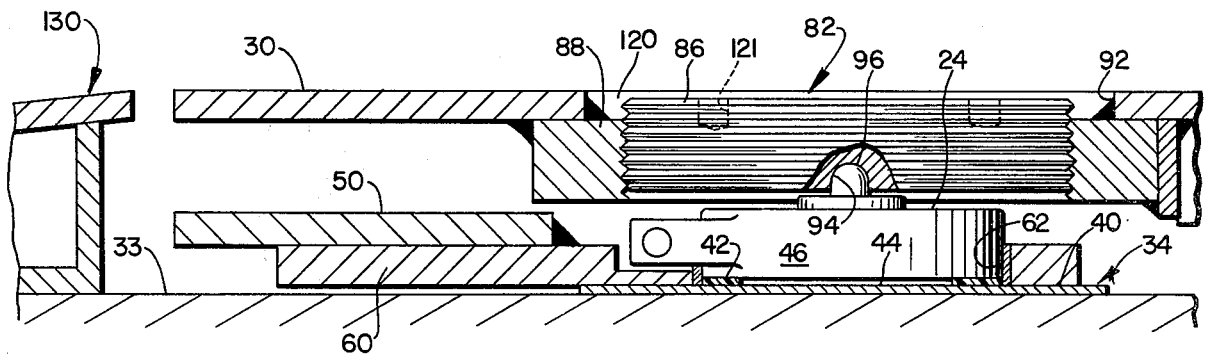
Figure 8:
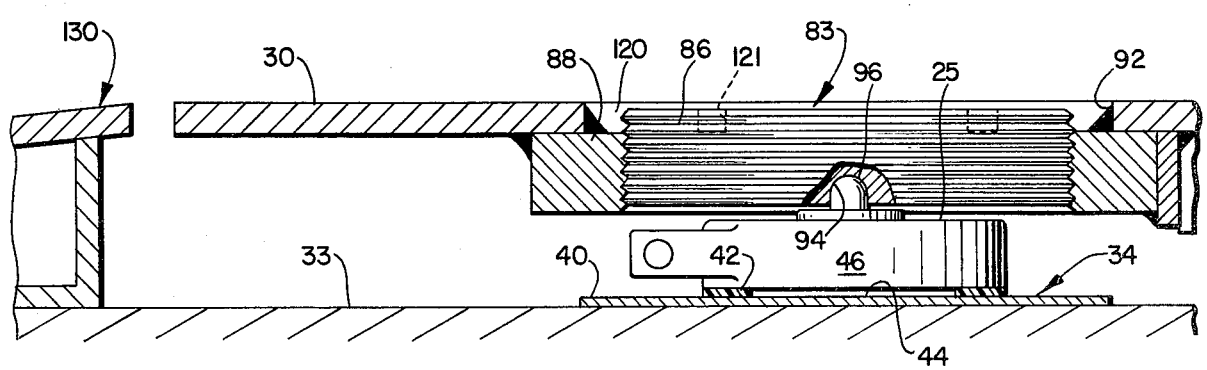
FIG. 8 is a section taken substantially along line 8—8 of FIG. 1.

As shown in FIGS. 3 and 7, a load cell retainer 60 is rigidly fixed as by welding to restraint bar 50 near the end of the restraint bar which is remote from anchor bolt 54. Load cell 24 is snugly seated in an aperture or opening 62 which is formed through retainer 60. Thus, load cell 24 is fixed against horizontal movement relative to retainer 60 and is consequently fixed against horizontal movement relative to restraint bar 50. In place of retainer 60, any other suitable means may be employed to fix load cell 24 against horizontal movement relative to restraint bar 50.

Figure 6:
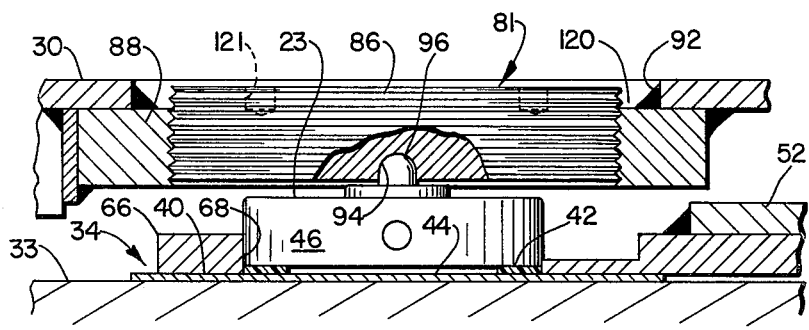
FIGS. 6 and 7 are sections respectively taken substantially along lines 6—6 and 7—7 of FIG. 1.

As shown in FIGS. 3 and 6, a load cell retainer 66 is rigidly fixed to restraint bar 52 at or near one end thereof. Load cell 23 is snugly seated in an aperture or opening 68 which is formed through retainer 66 so that load cell 23 is confined aginst horizontal movement relative to retainer 66. In place of retainer 66 any other suitable means may be employed to fix load cell 23 against horizontal movement relative to restraint bar 52.

A further load cell retainer 70 is pivotally connected to the other end of restraint bar 52 by a cylindrical pin 72. Load cell 22 is snugly seated in an aperture 74 which is formed through retainer 70 so that load cell 22 is confined against horizontal movement relative to retainer 70, but is pivotal with retainer 70 relative to restraint bar 52. The pivot axis of pin 72 is substantially parallel to that of anchor bolt 56.

No retainer, such as the ones shown for load cells 22–24, is required for load cell 25 since it is not connected to restraint system 28 except through the platform itself.

It will be appreciated that any suitable means may be employed for rigidly fixing load cells 24 and 23 to bars 50 and 52 respectively. Additionally, any suitable means may be employed for pivotally connecting load cell 22 to bar 52 to provide for the pivotal displacement of load cell 22 about an axis which is parallel to that of anchor bolt 56.

Although restraint bars 50 and 52 may be of any suitable configuration or construction for transferring horizontal forces to their respective anchor bolts 54 and 56, bars 50 and 52 are advantageously flat-sided as shown to minimize their thickness or height.

The effective length of restraint bar 52 between the axes of load cell 23 and anchor bolt 56 and the effective length of bar 52 between the axes of pivot pin 72 and anchor bolt 56 are substantially equal. More specifically the axis of anchor bolt 56 is substantially midway between parallel planes which normally intersect the longitudinal axis of bar 52 and which respectively contain the longitudinal axes of load cell 23 and pin 72.

The pivot axes of anchor bolt 56 and pivot pin 72 in addition to being substantially parallel, normally intersect the longitudinal axis of bar 52. A plane normally intersecting the longitudinal axis bar 52 contains both the pivot axis of pin 72 and the longitudinal axis of load cell 22 and is at right angles to a vertical plane which passes through the longitudinal axis of bar 52 and which contains the longitudinal axes of anchor bolt 56 and pin 72.

The longitudinal axes of load cell 22–25 are all substantially parallel with each other and with the longitudinal axes of anchor bolts 54 and 56. The vertical forces applied to load cells 22–25 are in alignment with the longitudinal axes of the load cells.

The longitudinal axes of restraint bars 50 and 52 are not required to be parallel with each other. Nor is it necessary that load cells 22–25 be located at the four corners of a rectangle.

With the arrangement shown in FIG. 3, a vertical plane containing the longitudinal axes of anchor bolts 54 and 56 extends transversely of, but not necessarily at right angles to the longitudinal axes of restraint bars 50 and 52.

In the illustrated embodiment of restraint system 28, load cell 25 is not connected or secured to any part of restraint system 28 except through the platform itself. Load cell 25 consequently floats with platform 30. That is, cell 25, by being slidable on pad 40, moves substantially freely with thermal expansion or growth of platform 30 and does not take any horizontal loads.

In this embodiment, the force attributable to a load on platform 30 is transferred to load cells 22–25 by any suitable structural members which form a part of structure 20. The particular structure shown in the drawings for transferring the force of a load on platform 30 to load cells 22–25 is not significant and does not form a part of the invention claimed herein.

In the illustrated embodiment the longitudinal axis of load cell 24 is laterally offset and thus spaced from the longitudinal axis of restraint bar 50. This arrangement is not essential to the proper operation of functioning of restraint system 28 and, instead, is merely a convenient arrangement locating restraint bar 50 completely inboard of platform 30.

As previously mentioned restraint system 28 is statically determinate. That is, the number of unknown horizontal reactions or reactive components developed by system 28 to maintain the scale in equilibrium is equal to the number of equations of equilibrium.

Considering the application of external horizontal forces or loads which are applied by or through platform 30 to load cell 24, it will be appreciated that only one reactive component acting only along one reaction line can occur at anchor bolt 54. This reactive component is indicated as $F_{R1}$ in FIG. 4. It may be a tension or compression component, and it acts along reaction line 100 which passes through the axes of load cell 24 and anchor bolt 54.

Accordingly, the assembly of bar 50 and anchor bolt 54 will only restrain external horizontal forces, such as force $F_1$, which act along line 100. If the external horizontal force at load cell 24 acts in any other direction, no reaction will occur, and pivotal movement will be imparted to bar 50.

Bar 50 is constructed to flex very slightly under the influence of force $F_1$ to thereby act as a shock absorber for horizontal shock loads.

From the foregoing it is evident that the assembly of bar 50, retainer 60 and load cell 24 constitutes a two force structure or body. A two-force structure or body is one which is loaded by two forces which respectively pass through two distinct points on the body and which act in such a direction as to maintain equilibrium of the body. In the example shown in FIG. 4, one force is force $F_1$ and the other is reaction $F_{R1}$.

Because of the respective pivotal and rigid connections of load cells 22 and 23 to restraint bar 52 and because of the pivotal connection of restraint bar 52 to anchor bolt 56, only two reactive components ($F_{R2}$ and $F_{R3}$) can occur at anchor bolt 56, with each of the reactive components $R_{R2}$ and $F_{R3}$ acting only along one horizontal reaction line. Reactive components $F_{R2}$ and $F_{R3}$, which may be tension or compression components, are mutually perpendicularly as shown.

The vectorial resultant of reactive components $F_{R2}$ and $F_{R3}$ is developed in opposition to the vectorial resultant of external horizontal forces $F_{X1}$, $F_{X2}$, and $F_Y$ to keep restraint bar 52 in equilibrium. Forces $F_{X1}$ is applied at load cell 22 and acts in a horizontal direction in a plane parallel to the axes of load cell 22 and pivot pin 72.

If the external horizontal force applied to load cell 22 acts along a line orthogonal to line 102, there will be no reaction, and load cell 22 will pivot about the axis of pivot pin 72. Because of this pivotal connection to bar 52 it is apparent that the assembly of load cell 22 and retainer 70 acts as a two-force body.

If load cell 22 takes an external horizontal force along line 102 load cell 23 will take a corresponding parallel external force (indicated at $F_{X2}$ in FIG. 4) so that no pivotal motion of restraint bar 52 will occur. Force $F_y$ also acts at load cell 23 at right angles to force $F_{X2}$.

If the vectorial resultant of forces $F_{X1}$, $F_{X2}$ and $F_y$ does not act along a line passing through anchor bolt 56, bar 52 will pivot about the axis of anchor bolt 56. If directions in which the external horizontal force initially act on any one or more of the load cells 22–24 does not result in equilibrium, only a very slight pivotal movement of either or both of the bars 50 and 52 takes place to establish an equilibrium condition in which all parts of the restraint system are stable.

Like restraint bar 50, bar 52 is constructed to flex very slightly under the influence of force $F_{X1}$, $F_{X2}$ and $F_y$ to thereby act as a shock absorber for horizontal shock loads which may be applied with relatively high velocity.

Because of the anti-friction seats 34 for load cells 22–25, no frictional forces of any consequences are developed at the interface between each load cell and its support to oppose pivotal displacement of restraint bars 50 and 52 about the axes of their respective anchor bolts or to oppose pivotal displacement of load cell 22 about the axis of pivot pin 72. Accordingly, there will be only three unknown reactive components ($F_{R1}$, $F_{R2}$ and $F_{R3}$) which are developed to maintain the free body assembly of restraint bars 50 and 52, load cells 22–25, and platform structure 20 stable or in equilibrium. Since this number of reactive components is equal to the number of equations of equilibrium, the restraint system is statically determinate.

From the foregoing desciption it will be appreciated that the purpose of restraint bars 50 and 52 is to transfer those forces which are to be restrained (namely, forces $F_1$, $F_{X1}$, $F_{X2}$ and $F_y$) to their respective anchor bolts 54 and 56.

By virtue of restraint system 28 being statically determinate, no reaction forces of any consequence are developed by thermal expansion of platform structure 20, mechanical strains in the platform and even horizontal movement of anchor bolts 54 and 56. As a result, no restraint of any consequence occurs due to thermal expansion of platform structure 20, to mechanical strains or distortions which may develop in the platform along a horizontal plane and to horizontal movement of anchor bolts 54 and 56. Since there is no restraint of any consequence to these conditions, no side loading of load cells 22–25 develops as a result of their occurence.

By virtue of bars 50 and 52 being capable of some flexure, restraint system 28 is effective to absorb a sufficient amount of shock loads or forces to prevent side loading of load cells 22–25 in excess of their peak side load capacity. Horizontal shock loads are developed momentarily from braking a moving vehicle or other roll-on or moving load or platform 30. Only slight flexure of bars 50 and 52 is required for this purpose so that bars 50 and 52 are relatively stiff. So far as static loads alone are concerned, as distinguished from moving loads, bars 50 and 52 may be rigid.

In addition to the foregoing advantages, the restraint system of this invention has a very small overall height. In this respect, the assembly of anti-friction seats 34 and restraint system 28 only extends below a plane containing the bottom faces of load cells 22–25 by the relatively small thicknesses of pad 40 and washer 42. Furthermore, the overall height of system 28 is so small that it does not extend above the plane containing the upper ends of load cells 22–25 even in constructions in which low-profile pancake load cells (having a height range from about 1 inch to about 1 ⅜ inch) are utilized.

In a practical application, pads 40 need only be about 1/16 inch thick and washer 42 need only be about 1/16 inch thick so that seats 34 only extend below a plane containing the bottom faces of load cells 22–25 by about ⅛. As a consequence, the floor-to-platform height (i.e., the height from surface 33 to the top load-receiving surface of platform 30) of the low profile scale of this invention is essentially only a function of the height of the load cells (which may be of the very low profile pancake type) and the relatively small thickness or height of the platform structure which lies above the upper ends of the load cells.

Additionally, restraint bars 50 and 52 themselves have such small thicknesses that they lie at least substantially entirely between two planes respectively containing the top and bottom end faces of load cells 22–25 even in applications where the low profile pancake type load cell is employed.

Figure 11:
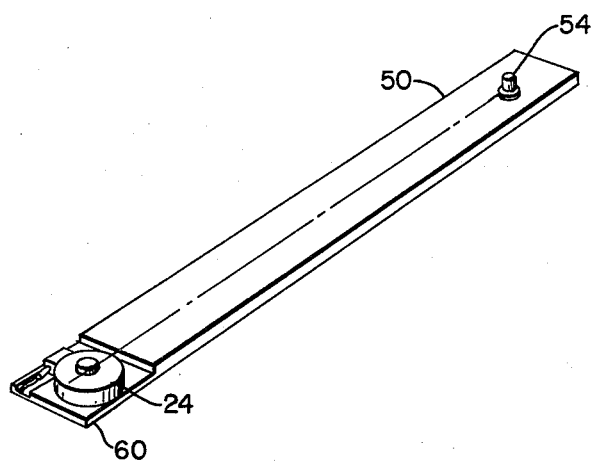
FIG. 11 is a fragmentary perspective view of a slightly modified horizontal restraint system showing an alternate location for the load cell which is illustrated in FIG. 7.

As previously mentioned, load cell 24 may optionally be positioned at a location where its longitudinal axis normally intersects the longitudinal axis of restraint bar 50 as shown in FIG. 11. With this arrangement, bar 50 functions as a non-flexible strut which will either be in compression or tension depending upon the direction of the applied force. In this case, only those horizontal forces which are applied along the longitudinal axis of bar 50 will be restrained or reacted, and horizontal forces applied along any other lines will result in pivotal displacement of bar 50 about the axis of anchor 54.

Another advantage of system 28 is that it requires only two anchoring points as provided by anchor bolts 54 and 56. This construction simplifies the installation of the scale.

It will be appreciated that statically determinate horizontal restraint may be achieved with constructions other than that shown in FIGS. 3 and 4.

Restraint system 28, however, has a number of advantages in addition to being statically determinate. First, it does not develop excessively large moments about the anchor point or points for the restraint system as a result of a vehicle or other rolling load moving on the platform or deck. Second, it requires only pivotal and rigid connections and no sliding connections. Third, the distribution of horizontal load to the load cells is reasonably satisfactory.

It will also be appreciated that the horizontal force restraint system of this invention is not limited to employment with pancake type load cells and instead may be utilized with any suitable load cells or transducers.

Additionally, the restraint system of this invention may advantageously be employed in various types of weighing scales such as tank scales and non-low profile vehicle platform scales.

It will also be appreciated that with the restraint system of this invention, no side load isolating structure is interposed vertically between the load cells and platform 30 to increase the floor-to-platform height of the scale as shown, for example, in the previously mentioned U.S. Pat. No. 3,587,761.

Restraint system 28 lies at least substantially entirely inboard of platform 30 as shown. In FIGS. 3 and 4, the outline of platform 30 is partially shown in phantom lines.

From the foregoing description it will be appreciated that the assembly of platform structure 20 and load cells 22–25 is secured to the scale support floor only through restraint system 28. Thus, the statically determinate restraint system of this invention develops substantially all of the reactive components for maintaining the platform and load cell assembly horizontally stable.

Referring again to FIG. 3 it will be appreciated that substantially no reactive components are developed by system 28 to restrain thermal expansion of platform structure 20, because thermal expansion in a longitudinal direction results in pivotal displacement of restraint bar 50 and horizontal displacement of cell 25 and thermal expansion of the transverse direction results in pivotal displacement of load cell 22 about the axis of pin 72 and horizontal displacement of cell 25.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A method of horizontally restraining the assembly of a load-receiving platform and platform supporting load cells in a platform weighing scale comprising the step of applying only a predetermined number of reactive components which is equal to the number of equations of equilibrium to maintain said assembly in equilibrium.

2. In a weighing scale, an assembly including a plurality of load cells and a load-receiving structure supported on said load cells, the improvement comprising a statically determinate restraint system for restraining horizontal movement of said assembly, said assembly being secured to a floor or support surface only through said restraint system.

3. The weighing scale defined in claim 2, including anti-friction means supporting each of the load cells.

4. The weighing scale defined in claim 3 wherein said restraint system includes a pair of restraint members which are adapted to be fixed to the scale-support floor or ground, a first force-transferring structure connecting said assembly to one of said restraint members to develop substantially only one reactive component which acts only along predetermined one reaction line at said one of said restraint members, and a second force transferring structure connecting said assembly to the other of said restraint members to develop substantially only two reactive components which respectively act only along two angularly spaced apart reaction lines at said other of said restraint members.

5. The weighing scale defined in claim 4 wherein said load-receiving structure is a platform and is supported on at least three load cells, wherein said first force-transferring structure comprises a structural member pivotally secured to said one of said restraint members for pivotal displacement about a vertical axis, wherein said second force-transferring structure comprises a structural member pivotally secured to the other of said restraint members for pivotal displacement about a vertical axis, wherein a first one of said load cells is horizontally fixed to the structural member of said first force-transferring structure, wherein a second one of said load cells is fixed to the structural member of said second force-transferring structure, and wherein a third one of said load cells is pivotally secured to the structural member of said second force-transferring structure for pivotal displacement about vertical axis.

6. The weighing scale defined in claim 2 wherein said restraint system has only two spaced apart anchoring points for securing said assembly to a floor or other scale support surface.

7. The weighing scale defined in claim 2 wherein said load receiving structure is a platform and wherein each of said load cells is confined against horizontal movement relative to said platform.

8. The weighing scale defined in claim 1, there being four of said load cells, and said load-receiving structure comprising a load-receiving platform.

9. In a platform weighing scale, an assembly including a plurality of load cells and a load-receiving platform structure supported on said load cells, the improvement comprising a statically determinate restraint system which develops substantially all of the reactive components for restraining horizontal movement of said assembly.

10. In a platform weighing scale, an assembly including a plurality of load cells and a load-receiving platform supported on said load cells, the improvement comprising a statically determinate restraint system for restraining horizontal movement of said assembly, said assembly being secured to a floor or support surface only through said restraint system to enable said restraint system to develop substantially all of the reactive components for restraining the horizontal movement of said assembly.

11. The platform weighing scale defined in claim 10 wherein each of said load cells is confined against horizontal movement relative to the region of the platform which it supports.

12. The platform weighing scale defined in claim 11 wherein each of said load cells is supported for sliding movement on a support surface.

13. The platform weighing scale defined in claim 11 wherein each load cell is seated on an anti-friction support which minimizes the development of motion-restraining reactive components at the interface between each load cell and its anti-friction support.

14. The platform weighing scale defined in claim 11 wherein said restraint system further includes a pair of restraint members which are adapted to be fixed to the scale-support floor or ground, a first force-transferring structure connecting said assembly to one of said restraint members to develop substantially only one reactive component which acts only along one reaction line at said one of said restraint members, and a second force transferring structure connecting said assembly to the other of said restraint members to develop substantially only two reactive components which respectively act only along two angularly spaced apart reaction lines at said other of said restraint members.

15. The platform weighing scale defined in claim 10 wherein said system has only two restraint points at which reactive components are developed to restrain horizontal movement of said assembly.

16. In a platform weighing scale, an assembly including (a) a plurality of load cells and (b) a load-receiving platform supported on said load cells, and a statically determinate restraint system for restraining horizontal movement of said assembly and including a fixed restraint member and a force transfer member secured to one of said load cells and pivotally secured to said restraint member for pivotal movement about a vertical axis.

17. In a platform weighing scale, an assembly including (a) a plurality of load cells and (b) a load receiving platform supported on said load cells, and a statically determinate restraint system for restraining horizontal movement of said assembly and including a fixed restraint member and a force transfer member pivotally connected to one of said load cells and pivotally secured to said restraint member for pivotal motion about a vertical axis.

18. In a platform scale, an assembly including (a) at least three load cells and (b) a load-receiving platform supported on said load cells, and a statically determinate restraint system for restraining horizontal movement of said assembly and including first and second anchors, a first force transferring member horizontally fixed to a first one of said load cells and pivotally secured to said first anchor for pivotal displacement about a vertical axis, and a second force transferring member horizontally fixed to a second one of said load cells and pivotally secured to a third one of said load cells, said second force transferring member being pivotally secured to said second anchor for pivotal displacement about a vertical axis.

19. In a low profile type platform weighing scale, a plurality of load cells, a load-receiving platform supported at different regions on said load cells, said load cells being positioned inboard of said platform to position said platform at a level above a scale support surface and a statically determinate restraint system for restraining horizontal movement of the assembly of said platform and said load cells, said restraint system having a force transferring structure for transferring external horizontal force from said assembly to at least one restraint point, and said force transferring structure lying entirely between the upper level of said load cells and said support surface.

20. The low profile type platform weighing scale defined in claim 19 wherein each of said load cells is of the pancake type.

21. The low profile type platform weighing scale defined in claim 19 wherein said force transferring structure comprises a horizontally extending member extending between and connected to at least one of said load cells and to a scale support floor or ground at said restraint point.

22. A low profile platform weighing scale comprising a load-receiving platform, load cell support means positioned on a support surface, a plurality of load cells slidably seated on said support means, said load cells being arranged inboard of and supporting said platform at a predetermined height above said support surface, and a statically determinate restraint system for restraining horizontal movement of the assembly of said platform and said load cells, except for the height of said support means, the height of the load receiving surface of said platform above said support surface being at least substantially only a function of the height of the load cells and the height of the platform which lies between the upper ends of said load cells and said loadreceiving surface.

23. The low profile platform weighing scale defined in claim 22 wherein said load-receiving surface is located at a level where no protrusions or obstructions extend above the load-receiving surface.

* * * * *